(12) United States Patent
Jeon et al.

(10) Patent No.: US 9,246,191 B2
(45) Date of Patent: Jan. 26, 2016

(54) NON-AQUEOUS ELECTROLYTE LITHIUM SECONDARY BATTERY

(75) Inventors: Jong-Ho Jeon, Daejeon (KR); Jeong-Ju Cho, Daejeon (KR); Ho-Chun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 3 days.

(21) Appl. No.: 13/446,009

(22) Filed: Apr. 13, 2012

(65) Prior Publication Data

US 2012/0196190 A1 Aug. 2, 2012

Related U.S. Application Data

(62) Division of application No. 12/678,109, filed as application No. PCT/KR2008/004982 on Aug. 26, 2008, now Pat. No. 9,105,943.

(30) Foreign Application Priority Data

Sep. 12, 2007 (KR) ........................ 10-2007-0092634

(51) Int. Cl.
| | |
|---|---|
| H01M 10/056 | (2010.01) |
| H01M 10/0569 | (2010.01) |
| H01M 10/0525 | (2010.01) |
| H01M 10/0567 | (2010.01) |
| H01M 4/48 | (2010.01) |
| H01M 4/587 | (2010.01) |
| H01M 4/02 | (2006.01) |
| H01M 10/42 | (2006.01) |

(52) U.S. Cl.
CPC ...... *H01M 10/0569* (2013.01); *H01M 10/0525* (2013.01); *H01M 10/0567* (2013.01); *H01M 4/483* (2013.01); *H01M 4/587* (2013.01); *H01M 2004/021* (2013.01); *H01M 2004/028* (2013.01); *H01M 2010/4292* (2013.01); *H01M 2300/004* (2013.01); *H01M 2300/0037* (2013.01); *Y02E 60/122* (2013.01); *Y02T 10/7011* (2013.01)

(58) Field of Classification Search
CPC ...... H01M 10/0525; H01M 10/0567; H01M 10/0569; H01M 2004/021; H01M 2004/028; H01M 2010/4292; H01M 2300/0037; H01M 2300/004; H01M 4/483; H01M 4/587; Y02E 60/122; Y02T 10/7011
See application file for complete search history.

(56) References Cited

U.S. PATENT DOCUMENTS

| | | | |
|---|---|---|---|
| 5,256,504 | A | 10/1993 | Okuno et al. |
| 5,284,722 | A * | 2/1994 | Sugeno ..................... 429/332 |
| 6,399,255 | B2 * | 6/2002 | Herreyre et al. .......... 429/331 |
| 7,083,878 | B2 | 8/2006 | Kotato et al. |
| 7,201,994 | B2 | 4/2007 | Watanabe et al. |
| 2001/0019800 | A1 | 9/2001 | Herreyre et al. |
| 2002/0102466 | A1 | 8/2002 | Hwang et al. |
| 2006/0121356 | A1 * | 6/2006 | Jan et al. .................. 429/331 |
| 2007/0048607 | A1 | 3/2007 | Nakashima et al. |
| 2007/0092802 | A1 * | 4/2007 | Ahn et al. ................. 429/326 |
| 2008/0305401 | A1 * | 12/2008 | Smart et al. .............. 429/326 |
| 2009/0253048 | A1 | 10/2009 | Shima |

FOREIGN PATENT DOCUMENTS

| | | |
|---|---|---|
| EP | 1598895 A1 | 11/2005 |
| JP | 7-153486 A | 6/1995 |
| JP | 1997-213366 A | 8/1997 |
| JP | 11-31527 A | 2/1999 |
| JP | 3029271 B2 | 2/2000 |
| JP | 3032338 B2 | 4/2000 |
| JP | 2001-222995 A | 8/2001 |
| KR | 10-2001-0048933 A | 6/2001 |
| KR | 10-2007-0019965 A | 2/2007 |
| WO | WO 97/43795 A1 | 11/1997 |
| WO | WO 98/59387 A2 | 12/1998 |
| WO | WO 99/54953 A1 | 10/1999 |
| WO | WO 2006/132372 A1 | 12/2006 |

OTHER PUBLICATIONS

KIPO International Search Report for Appl. No. PCT/KR2008/004982 dated Nov. 21, 2008.
PCT Written Opinion of the International Searching Authority for Appl. No. PCT/KR2008/004982 dated Nov. 21, 2008.
Du Pasquier et al.: "Microstructure effects in plasticized electrodes based on PVDF HFP for plastic Li-ion batteries", Journal of Power Sources, vol. 97-98 (2001), p. 758-761.
Makrides et al.: "Rechargeable LilTiS2 AA cells", Proceedings of the Int'l Power Sources Symposium. Cherry Hill, Jun. 25-28, 1990; New York, IEEE, US, vol. SYMP. 34, Jun. 25, 1990, p. 167-171.

* cited by examiner

*Primary Examiner* — Carlos Barcena
(74) *Attorney, Agent, or Firm* — Birch, Stewart, Kolasch & Birch, LLP

(57) ABSTRACT

A lithium secondary battery has an anode, a cathode, a separator between the anode and the cathode and a non-aqueous electrolyte. The non-aqueous electrolyte includes a lithium salt; and a non-linear carbonate-based mixed organic solvent in which (a) a cyclic carbonate compound, and (b) a propionate-based compound are mixed at a volume ratio (a:b) in the range from about 10:90 to about 70:30. The cathode has a capacity density in the range from about 3.5 to about 5.5 mAh/$cm^2$ and a porosity in the range from about 18 to about 35%. This battery may be manufactured as a high-loading lithium secondary battery.

7 Claims, No Drawings

NON-AQUEOUS ELECTROLYTE LITHIUM SECONDARY BATTERY

This application is a Divisional of co-pending application Ser. No. 12/678,109 filed Mar. 12, 2010, which is the National phase of PCT International Application No. PCT/KR2008/004982 filed on Aug. 26, 2008. This application also claims priority to Patent Application No. 10-2007-0092634 filed in the Republic of Korea on Sep. 12, 2007. All of the above applications' are hereby expressly incorporated by reference into the present application.

BACKGROUND OF THE INVENTION

1. Field of the Invention

The present invention relates to a non-aqueous electrolyte lithium secondary battery, and more particularly to a high-loading lithium secondary battery.

2. Description of the Related Art

Recently, interest in energy storage technologies has increased. As the energy storage technologies are extended to cellular phones, camcorders and notebook PCs, and further to electric auto vehicles, the demand for a high energy concentration of a battery used as a power source of such an electronic device is increased. A lithium ion secondary battery is one of the most satisfactory batteries, and numerous studies towards improvements are now in progress actively.

Among the currently used secondary batteries, a lithium secondary battery developed in the early 1990's includes an anode made of carbon material capable of occluding or emitting lithium ions, a cathode made of lithium-containing oxide, and a non-aqueous electrolyte obtained by dissolving a suitable amount of lithium salt in a mixed organic solvent.

The lithium secondary battery has an average discharge voltage of about 3.6 V to 3.7V, which exhibits advantageously higher operation voltage than those of other batteries such as alkali batteries or nickel-cadmium batteries. To create such a higher operation voltage, an electrolyte composition should be electrochemically stable in a charging/discharging voltage range from 0 to 4.2V. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent for the electrolyte. The solute of the electrolyte is usually a lithium salt, such as $LiPF_6$, $LiBF_4$ or $LiClO_4$, which acts as a source for supplying lithium ions in the battery and thus enables the lithium battery to operate.

Lithium ions coming out from the cathode active material such as lithium metal oxide during an initial charging process of a lithium secondary battery move towards the anode active material such as graphite and then are intercalated between layers of the anode active material. At this time, due to the high reactivity of lithium, the electrolyte reacts with carbon of the anode active material on the surface of the anode active material such as graphite, thereby generating compounds such as $Li_2CO_3$, $Li_2O$ and $LiOH$. These compounds form a kind of SEI (Solid Electrolyte Interface) film on the surface of the anode active material such as graphite.

The SEI film plays the role of an ion tunnel, which allows only lithium ions to pass. Due to the ion tunnel effects, the SEI film prevents organic solvent having a high molecular weight from moving together with lithium ions in the electrolyte and being intercalated into layers of the anode active material and thus breaking down the anode structure. Thus, since the electrolyte is not contacted with the anode active material, the electrolyte is not decomposed, and also the amount of lithium ions in the electrolyte is reversibly maintained, thereby ensuring stable charging/discharging.

However, in a thin angled battery, while the above SEI film is formed, gas such as $CO$, $CO_2$, $CH_4$ and $C_2H_6$, generated by decomposition of a carbonate-based solvent, increases the battery thickness during the charging process. In addition, if a battery is left at a high temperature in a fully charged state, the SEI film is slowly broken down due to increased electrochemical energy and thermal energy over time. As a result, side reactions continuously occur between the exposed surface of the anode and surrounding electrolyte. Due to continuous gas generation at this time, an inner pressure of the battery, for example, an angled battery or pouch-type battery, is increased, thereby increasing thickness of the battery, and this may cause problems in electronics such as cellular phones and notebook computers with regard to a high-temperature performance of the battery. In addition, the lithium secondary battery containing a large amount of ethylene carbonate exhibits a more serious problem in inner pressure increase of the battery since the SEI film is unstable. Further, since the ethylene carbonate has a high freezing point (37 to 39° C.) and it is in a solid state at room temperature, it has low ionic conductivity at a low temperature. Thus, a lithium battery using a non-aqueous solvent containing a large amount of ethylene carbonate exhibits poor low-temperature conductivity.

In order to solve the above problem, it has been suggested to use a method of adding a carbonate-based organic additive to the electrolyte so as to change the phase of the SEI film forming reaction. However, it is so far known in the art that, when the above specific compound is added to an electrolyte to improve the battery performance, some areas of performance are improved, but other areas of performance may deteriorate in many cases.

For example, Japanese Laid-open Patent Publication No. H07-153486 discloses a lithium secondary battery using an electrolyte made by adding 0.5 to 50 volume % of γ-butyrolactone to a 1:1 (volume ratio) mixture of ethylene carbonate and dimethyl carbonate. However, if γ-butyrolactone is added in this manner, the life cycle of the battery may be shortened though high-rate discharging characteristics at a low temperature are improved.

In addition, Japanese Patent No. 3,032,338 discloses a non-aqueous electrolyte secondary battery containing a ternary system organic solvent composed of ethylene carbonate, dimethyl carbonate and methyl propionate. However, a linear carbonate such as dimethyl carbonate deteriorates charging/discharging cycle efficiencies of a lithium secondary battery, and methyl propionate deteriorates discharging characteristics since it has a relatively high reactivity with the anode. In addition, Japanese Laid-open Patent Publication No. 1999-31527 discloses a non-aqueous electrolyte secondary battery containing a ternary system organic solvent composed of a cyclic carbonate, linear carbonate and ethyl propionate. However, this lithium secondary battery shows deteriorated charging/discharging cycle efficiencies due to the linear carbonate, and it is difficult to obtain good low-temperature discharging characteristics since a small amount of ethyl propionate, as much as 5 volume % or less, is added.

Meanwhile, Japanese Patent No. 3,029,271 discloses a lithium secondary battery using a mixed organic solvent in which a cyclic carbonate such as propylene carbonate and a linear ester carbonate compound such as methyl acetate are mixed. However, methyl acetate also has relatively high reactivity with an anode, so a discharging characteristic deteriorate.

The above problems of the conventional non-aqueous electrolyte composition are more serious in a high-loading lithium secondary battery in which a cathode has a capacity density of 3.5 mAh/cm² or above. Thus, it is an urgent demand to develop a non-aqueous electrolyte composition capable of providing a high-loading lithium secondary battery that exhibits excellent high-rate charging/discharging characteristics, low-temperature discharging characteristics and life cycle.

SUMMARY OF THE INVENTION

The present invention is designed to solve the problems of the prior art, and therefore it is an object of the present invention to provide a high-loading lithium secondary battery, which exhibits excellent high-rate charging/discharging characteristics and ensures improved life cycle and low-temperature discharging characteristics.

In order to accomplish the above object, the present invention provides a lithium secondary battery having an anode made of carbon material capable of occluding or emitting a lithium ion, a cathode made of lithium-contained oxide, and a non-aqueous electrolyte, wherein the non-aqueous electrolyte includes a lithium salt; and a non-linear carbonate-based mixed organic solvent in which (a) a cyclic carbonate compound selected from the group consisting of a carbonate compound expressed by the following Chemical Formula 1, a carbonate compound expressed by the following Chemical Formula 2, and their mixtures and (b) a propionate-based ester compound expressed by the following Chemical Formula 3 are mixed at a volume ratio (a:b) in the range from about 10:90 to about 70:30, wherein the cathode has a capacity density in the range from about 3.5 to about 5.5 mAh/cm² and a porosity in the range from about 18 to about 35%.

Chemical Formula 1

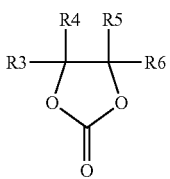

where R3 to R6 are independently any one selected from the group consisting of a hydrogen atom, fluorine, and an alkyl group having a carbon number of 1 to 4, respectively.

Chemical Formula 2

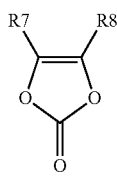

where R7 and R8 are independently a hydrogen atom or an alkyl group having a carbon number of 1 to 4, respectively.

Chemical Formula 3

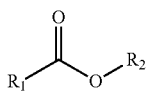

where $R_1$ and $R_2$ are independently a linear or branched $C_{1-6}$ alkyl group, and $R_1$ and $R_2$ may be unsubstituted or substituted with at least one halogen, respectively. Preferably, $R_1$ is a $CH_3CH_2$ group.

Non-limiting examples of the propionate-based ester compound expressed by the Chemical Formula 3 include at least one compound selected from the group consisting of methyl propionate-based ester, ethyl propionate-based ester, propyl propionate-based ester, and butyl propionate-based ester.

The ethyl propionate-based ester compound expressed by the following Chemical Formula 4 is more preferable.

Chemical Formula 4

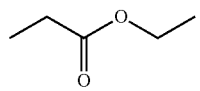

where at least one hydrogen atom may be substituted with fluorine.

In the lithium secondary battery according to the present invention, the carbonate compound expressed by the Chemical Formula 1 may include any one compound or a mixture of at least two compounds selected from the group consisting of ethylene carbonate, propylene carbonate, fluoroethylene carbonate and butylene carbonate, but it is not limited thereto.

In addition, in the lithium secondary battery according to the present invention, the propionate-based ester compound expressed by the Chemical Formula 3 may include any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

As explained above, a lithium secondary battery includes an anode made of carbon material capable of occluding or emitting common lithium ions, a cathode made of lithium-containing oxide, and a non-aqueous electrolyte.

In the lithium secondary battery according to the present invention, the non-aqueous electrolyte includes a lithium salt; and a non-linear carbonate-based mixed organic solvent in which (a) a cyclic carbonate compound selected from the group consisting of a carbonate compound expressed by the following Chemical Formula 1, a carbonate compound expressed by the following Chemical Formula 2, and their mixtures and (b) a propionate-based ester compound expressed by the following Chemical Formula 3 are mixed at a volume ratio (a:b) in the range from about 10:90 to about 70:30.

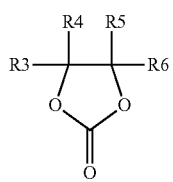

Chemical Formula 1 where R3 to R6 are independently any one selected from the group consisting of a hydrogen atom, fluorine, and an alkyl group having a carbon number of 1 to 4, respectively.

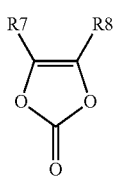

Chemical Formula 2 where R7 and R8 are independently a hydrogen atom or an alkyl group having a carbon number of 1 to 4, respectively.

Chemical Formula 3

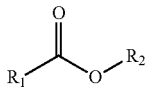

where $R_1$ and $R_2$ are independently a linear or branched $C_{1-6}$ alkyl group, and $R_1$ and $R_2$ may be unsubstituted or substituted with at least one halogen, respectively. Preferably $R_1$ is a $CH_3CH_2$ group.

Non-limiting examples of the propionate-based ester compound expressed by the Chemical Formula 3 include at least one compound selected from the group consisting of methyl propionate-based ester, ethyl propionate-based ester, propyl propionate-based ester, and butyl propionate-based ester.

The ethyl propionate-based ester compound expressed by the following Chemical Formula 4 is more preferable.

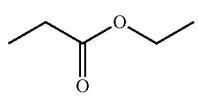

Chemical Formula 4 where at least one hydrogen atom may be substituted with fluorine.

The cyclic carbonate compound expressed by the Chemical Formula 1 or 2 easily dissociates a lithium salt in an electrolyte, so it attributes to improvement of a charging/discharging capacity of a battery. The carbonate compound expressed by the Chemical Formula 1 may be ethylene carbonate, propylene carbonate, fluoroethylene carbonate and butylene carbonate alone or in combination. In particular, ethylene carbonate or a mixture of ethylene carbonate and propylene carbonate may more easily dissociate a lithium salt in an electrolyte due to a high dielectric rate.

Also, the carbonate compound expressed by the Chemical Formula 2 may include a vinylene carbonate.

One of the non-aqueous electrolytes employed in the lithium secondary battery according to the present invention is a carbonate compound, which uses the cyclic carbonate compound expressed by the Chemical Formula 1 or 2, namely a non-linear carbonate compound. Thus, though a linear carbonate compound is not added to improve charging/discharging efficiency of the lithium secondary battery, a small amount of linear carbonate compound may be added if it does not cause negative properties inconsistent with the purpose of the present invention.

The propionate-based ester compound expressed by the Chemical Formula 3 is a linear ester that has a low freezing point and a high boiling point and exhibits excellent low-temperature characteristics. Also, the propionate-based ester compound exhibits relatively low reactivity with an anode. Such propionate-based ester compound is mixed with the above-mentioned cyclic carbonate, attributing to improvement of low-temperature discharging characteristics, high-rate discharging characteristics and life cycle of the lithium secondary battery. That is to say, the propionate-based ester compound improves low-temperature discharging characteristics and high-rate discharging characteristics of a battery since it exhibits high ionic conductivity at normal and low temperatures by suitably coordinating lithium ions. In addition, an oxidation voltage of the propionate-based compound, which is an inherent properties of solvent, is about 4.5V or above, so it gives resistance against decomposition reaction of electrolyte at a cathode during a charging process, thereby extending life cycle of a battery. Also, since wettability to an electrode is improved rather than when only an ester carbonate solvent is used as a non-aqueous electrolyte, it restrains formation of lithium dendrite on an electrode surface, thereby improving safety of a battery. The ethyl propionate-based compound expressed by the Chemical Formula 4 may include ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate alone or in combination.

In the mixed organic solvent of a non-aqueous electrolyte as mentioned above, a volume ratio (a:b) of (a) the cyclic carbonate compound and (b) the propionate-based ester compound is preferably in the range from about 10:90 to about 70:30, more preferably from about 20:80 to about 60:40. If the volume ratio of propionate-based ester compound is less than the above range, low-temperature discharging characteristics of a lithium secondary battery deteriorate. If the volume ratio of propionate-based ester compound exceeds the above range, high-rate charging/discharging characteristics of a lithium secondary battery decrease.

Meanwhile, in the lithium secondary battery of the present invention, the cathode has a capacity density in the range from about 3.5 to about 5.5 mAh/cm². If the capacity density of the cathode is less than about 3.5 mAh/cm², the lithium secondary battery is unsuitable for a high-loading lithium secondary battery. If the capacity density of the cathode exceeds about 5.5 mAh/cm², wettability of the electrolyte is insufficient. Accordingly, it is difficult to realize the performance of a high-loading lithium secondary battery. Also, in the lithium secondary battery of the present invention, the cathode has a porosity in the range from about 18 to about 35%. If the porosity of the cathode is less than about 18%, it is difficult to make an electrode, or the electrolyte exhibits deteriorated wettability. If the porosity exceeds about 35%, side reaction between the electrolyte and the electrode is increased, so it is not easy to make a small size battery with higher capacity.

In the lithium secondary battery of the present invention, the lithium salt included as an electrolyte may include any compounds commonly used as an electrolyte for a lithium secondary battery. Non-limiting examples of The lithium salt may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$. In addition, other compounds such as lactone, ether, ester, acetonitrile, lactam, and ketone may be added to the non-aqueous electrolyte of the lithium secondary battery without departing from the purpose of the present invention.

The anode made of a carbon material capable of occluding or emitting a lithium ion and the cathode made of lithium-containing oxide, which is used for the lithium secondary battery of the present invention, may be any one commonly used for making a lithium secondary battery.

For example, the carbon material capable of occluding or emitting a lithium ion may be low-crystalline carbon or high-crystalline carbon. The low-crystalline carbon may include soft carbon or hard carbon, and the high-crystalline carbon may include natural graphite, Kish graphite, pyrolytic carbon, mesophase pitch based carbon fiber, meso-carbon microbeads, mesophase pitches, and high-temperature sintered carbon such as petroleum or coal tar pitch derived cokes, it is not limited thereto. At this time, the anode may have a binding agent, of which non-limiting examples may include various kinds of binder polymers such as PVDF-co-HFP (Polyvinyliden-co-hexafluoropropylene), polyvinylidene-fluoride (PVDF), polyacrylonitrile, polymethylmethacrylate, SBR (styrene-butadiene rubber) copolymer, and modified styrene-butadiene copolymer.

The kind of the binder used in the present invention may vary depending on the specific surface area size of the anode. In particular, organic-based binder such as polyvinylidene-fluorides (PVDFs) may be employed for the anode having a small specific surface area of less than about 1.5 $m^2/g$, especially from about 0.5 $m^2/g$ to about 1.5 $m^2/g$. On the other hand, water-based binder such as Styrene Butadiene Rubbers (SBRs) may be employed for the anode having a large specific surface area of more than about 1.5 $m^2/g$, especially from about 1.5 $m^2/g$ to about 4.5 $m^2/g$. It is a fact that the larger the specific surface area of the anode, the more the linear ester compound reacts with the anode active material. As a result, use of a PVDF-based binder may lead to acceptable side reductive reactions between the anode and the linear ester compound. However, an SBR-based binder promotes excessive reductive reactions between the two. The side reactions proceed more rapidly at a high temperature, resulting in a decline of the battery performance. Therefore, the secondary battery fabricated by using the water-based binder requires an anode inhibitor to prevent the side reactions. Water-based SBR is more preferable.

In addition, a cathode active material made of lithium-containing oxide preferably employs a lithium-containing transition metal oxide, for example any one material or a mixture of at least two materials selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0≤y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ and $LiFePO_4$.

The electrode of the lithium secondary battery according to the present invention may be conventionally manufactured in a way of making a slurry by adding electrode active material particles and binder polymer, together with conductive material and dispersing agent if required, to a solvent, then coating a capacity collector with the slurry, and then compressing and drying it. At this time, the capacity density and porosity of the cathode are controlled to range from about 3.5 to about 5.5 $mAh/cm^2$ and from about 18 to about 35%, respectively. A cathode with such capacity density and porosity may be easily prepared by those of ordinary skill in the art by controlling thickness of the cathode active material applied on the capacity collector, amount of binder polymer, process conditions, or the like.

In the lithium secondary battery according to the present invention, an inhibitor against reaction between ethyl propionate and the anode preferably may be used. As the inhibitor, any one compound or a mixture of at least two compounds are selected from the group consisting of cyclic carbonate with a vinyl group, fluorinated ethylene carbonate, vinylene carbonate, cyclic acid anhydride, a compound having a cyclic S=O group, and an acrylate-based compound. The content of the added inhibitor against a reaction between the anode and the ethyl propionate may be about 1 to about 10 weight % based on the total weight of the non-aqueous electrolyte.

In addition, a separator is generally interposed between the cathode and the anode, and the separator may be common porous polymer films used as a conventional separator. For example, porous polymer film prepared from polyolefins such as ethylene homopolymer, propylene homopolymer, ethylene/butene copolymer, ethylene/hexene copolymer or ethylene/methacrylate copolymer, in a single layer or in laminate form. Besides, the separator may be a common porous non-woven fabric such as a non-woven fabric made of glass fiber with a high melt point or polyethylene terephthalate fiber, but it is not limited thereto.

There is no particular limitation regarding the type of shape of the lithium secondary battery which may be a cylindrical can shape, an angled shape, a pouch shape or a coin shape.

Hereinafter, the present invention is explained in more detail using embodiments. However, the following embodiments may be modified in various ways, and the present invention should not be interpreted as being limited thereto. The following embodiments are just given for persons having ordinary skill in the art to understand the present invention in a better way.

Comparative Example 1

1M of $LiPF_6$ was added to a mixed organic solvent in which ethylene carbonate and ethylmethyl carbonate are mixed in a volume ratio of 1:2, thereby preparing a non-aqueous electrolyte.

A cathode having a capacity density of 3.5 $mAh/cm^2$ and a porosity of 19% was made using $LiCoO_2$ as a cathode active material, and artificial graphite was used as an anode active material. Then, a pouch-type lithium secondary battery was manufactured in a common way using the non-aqueous electrolyte prepared as in the above.

Comparative Example 2

A lithium secondary battery was manufactured in the same way as in the Comparative Example 1, except that dimethyl carbonate was used instead of ethylmethyl carbonate.

Comparative Example 3

A lithium secondary battery was manufactured in the same way as in the Comparative Example 1, except that diethyl carbonate was used instead of ethylmethyl carbonate.

Comparative Example 4

A lithium secondary battery was manufactured in the same way as in the Comparative Example 1, except that fluoroethylene carbonate was used instead of ethylene carbonate.

Comparative Example 5

A lithium secondary battery was manufactured in the same way as in the Comparative Example 2, except that fluoroethylene carbonate was used instead of ethylene carbonate.

Comparative Example 6

A lithium secondary battery was manufactured in the same way as in the Comparative Example 3, except that fluoroethylene carbonate was used instead of ethylene carbonate.

Comparative Example 7

A lithium secondary battery was manufactured in the same way as in the Comparative Example 1, except that a cathode having a capacity density of 4.5 mAh/cm$^2$ was made using $LiCoO_2$ as a cathode active material.

Comparative Example 8

A lithium secondary battery was manufactured in the same way as in the Comparative Example 2, except that a cathode having a capacity density of 4.5 mAh/cm$^2$ was made using $LiCoO_2$ as a cathode active material.

Comparative Example 9

A lithium secondary battery was manufactured in the same way as in the Comparative Example 3 except that a cathode having a capacity density of 4.5 mAh/cm$^2$ was made using $LiCoO_2$ as a cathode active material.

Comparative Example 10

A lithium secondary battery was manufactured in the same way as in the Comparative Example 4 except that a cathode having a capacity density of 4.5 mAh/cm$^2$ was made using $LiCoO_2$ as a cathode active material.

Comparative Example 11

A lithium secondary battery was manufactured in the same way as in the Comparative Example 5 except that a cathode having a capacity density of 4.5 mAh/cm$^2$ was made using $LiCoO_2$ as a cathode active material.

Comparative Example 12

A lithium secondary battery was manufactured in the same way as in the Comparative Example 6 except that a cathode having a capacity density of 4.5 mAh/cm$^2$ was made using $LiCoO_2$ as a cathode active material.

Comparative Example 13

A lithium secondary battery was manufactured in the same way as in the Comparative Example 1, except that a cathode having a capacity density of 5.5 mAh/cm$^2$ was made using $LiCoO_2$ as a cathode active material.

Comparative Example 14

A lithium secondary battery was manufactured in the same way as in the Comparative Example 2, except that a cathode having a capacity density of 5.5 mAh/cm$^2$ was made using $LiCoO_2$ as a cathode active material.

Comparative Example 15

A lithium secondary battery was manufactured in the same way as in the Comparative Example 3, except that a cathode having a capacity density of 5.5 mAh/cm$^2$ was made using $LiCoO_2$ as a cathode active material.

Comparative Example 16

A lithium secondary battery was manufactured in the same way as in the Comparative Example 4, except that a cathode having a capacity density of 5.5 mAh/cm$^2$ was made using $LiCoO_2$ as a cathode active material.

Comparative Example 17

A lithium secondary battery was manufactured in the same way as in the Comparative Example 5, except that a cathode having a capacity density of 5.5 mAh/cm$^2$ was made using $LiCoO_2$ as a cathode active material.

Comparative Example 18

A lithium secondary battery was manufactured in the same way as in the Comparative Example 6 except that a cathode having a capacity density of 5.5 mAh/cm$^2$ was made using $LiCoO_2$ as a cathode active material.

Comparative Example 19

A lithium secondary battery was manufactured in the same way as in the Comparative Example 1, except that a cathode having a porosity of 26% was made using $LiCoO_2$ as a cathode active material.

Comparative Example 20

A lithium secondary battery was manufactured in the same way as in the Comparative Example 2, except that a cathode having a porosity of 26% was made using $LiCoO_2$ as a cathode active material.

Comparative Example 21

A lithium secondary battery was manufactured in the same way as in the Comparative Example 3, except that a cathode having a porosity of 26% was made using $LiCoO_2$ as a cathode active material.

Comparative Example 22

A lithium secondary battery was manufactured in the same way as in the Comparative Example 4, except that a cathode having a porosity of 26% was made using $LiCoO_2$ as a cathode active material.

Comparative Example 23

A lithium secondary battery was manufactured in the same way as in the Comparative Example 5, except that a cathode having a porosity of 26% was made using $LiCoO_2$ as a cathode active material.

Comparative Example 24

A lithium secondary battery was manufactured in the same way as in the Comparative Example 6, except that a cathode having a porosity of 26% was made using $LiCoO_2$ as a cathode active material.

Comparative Example 25

A lithium secondary battery was manufactured in the same way as in the Comparative Example 7, except that a cathode having a porosity of 26% was made using $LiCoO_2$ as a cathode active material.

Comparative Example 26

A lithium secondary battery was manufactured in the same way as in the Comparative Example 8, except that a cathode having a porosity of 26% was made using $LiCoO_2$ as a cathode active material.

Comparative Example 27

A lithium secondary battery was manufactured in the same way as in the Comparative Example 9, except that a cathode having a porosity of 26% was made using $LiCoO_2$ as a cathode active material.

Comparative Example 28

A lithium secondary battery was manufactured in the same way as in the Comparative Example 10, except that a cathode having a porosity of 26% was made using $LiCoO_2$ as a cathode active material.

Comparative Example 29

A lithium secondary battery was manufactured in the same way as in the Comparative Example 11, except that a cathode having a porosity of 26% was made using $LiCoO_2$ as a cathode active material.

Comparative Example 30

A lithium secondary battery was manufactured in the same way as in the Comparative Example 12, except that a cathode having a porosity of 26% was made using $LiCoO_2$ as a cathode active material.

Comparative Example 31

A lithium secondary battery was manufactured in the same way as in the Comparative Example 13, except that a cathode having a porosity of 26% was made using $LiCoO_2$ as a cathode active material.

Comparative Example 32

A lithium secondary battery was manufactured in the same way as in the Comparative Example 14, except that a cathode having a porosity of 26% was made using $LiCoO_2$ as a cathode active material.

Comparative Example 33

A lithium secondary battery was manufactured in the same way as in the Comparative Example 15, except that a cathode having a porosity of 26% was made using $LiCoO_2$ as a cathode active material.

Comparative Example 34

A lithium secondary battery was manufactured in the same way as in the Comparative Example 16, except that a cathode having a porosity of 26% was made using $LiCoO_2$ as a cathode active material.

Comparative Example 35

A lithium secondary battery was manufactured in the same way as in the Comparative Example 17, except that a cathode having a porosity of 26% was made using $LiCoO_2$ as a cathode active material.

Comparative Example 36

A lithium secondary battery was manufactured in the same way as in the Comparative Example 18, except that a cathode having a porosity of 26% was made using $LiCoO_2$ as a cathode active material.

Comparative Example 37

A lithium secondary battery was manufactured in the same way as in the Comparative Example 1, except that a cathode having a porosity of 34% was made using $LiCoO_2$ as a cathode active material.

Comparative Example 38

A lithium secondary battery was manufactured in the same way as in the Comparative Example 2, except that a cathode having a porosity of 34% was made using $LiCoO_2$ as a cathode active material.

Comparative Example 39

A lithium secondary battery was manufactured in the same way as in the Comparative Example 3, except that a cathode having a porosity of 34% was made using $LiCoO_2$ as a cathode active material.

Comparative Example 40

A lithium secondary battery was manufactured in the same way as in the Comparative Example 4, except that a cathode having a porosity of 34% was made using $LiCoO_2$ as a cathode active material.

Comparative Example 41

A lithium secondary battery was manufactured in the same way as in the Comparative Example 5, except that a cathode having a porosity of 34% was made using $LiCoO_2$ as a cathode active material.

Comparative Example 42

A lithium secondary battery was manufactured in the same way as in the Comparative Example 6, except that a cathode having a porosity of 34% was made using $LiCoO_2$ as a cathode active material.

Comparative Example 43

A lithium secondary battery was manufactured in the same way as in the Comparative Example 7, except that a cathode having a porosity of 34% was made using $LiCoO_2$ as a cathode active material.

Comparative Example 44

A lithium secondary battery was manufactured in the same way as in the Comparative Example 8, except that a cathode having a porosity of 34% was made using $LiCoO_2$ as a cathode active material.

Comparative Example 45

A lithium secondary battery was manufactured in the same way as in the Comparative Example 9, except that a cathode having a porosity of 34% was made using $LiCoO_2$ as a cathode active material.

Comparative Example 46

A lithium secondary battery was manufactured in the same way as in the Comparative Example 10, except that a cathode having a porosity of 34% was made using $LiCoO_2$ as a cathode active material.

Comparative Example 47

A lithium secondary battery was manufactured in the same way as in the Comparative Example 11, except that a cathode having a porosity of 34% was made using $LiCoO_2$ as a cathode active material.

Comparative Example 48

A lithium secondary battery was manufactured in the same way as in the Comparative Example 12, except that a cathode having a porosity of 34% was made using $LiCoO_2$ as a cathode active material.

Comparative Example 49

A lithium secondary battery was manufactured in the same way as in the Comparative Example 13, except that a cathode having a porosity of 34% was made using $LiCoO_2$ as a cathode active material.

Comparative Example 50

A lithium secondary battery was manufactured in the same way as in the Comparative Example 14, except that a cathode having a porosity of 34% was made using $LiCoO_2$ as a cathode active material.

Comparative Example 51

A lithium secondary battery was manufactured in the same way as in the Comparative Example 15, except that a cathode having a porosity of 34% was made using $LiCoO_2$ as a cathode active material.

Comparative Example 52

A lithium secondary battery was manufactured in the same way as in the Comparative Example 16, except that a cathode having a porosity of 34% was made using $LiCoO_2$ as a cathode active material.

Comparative Example 53

A lithium secondary battery was manufactured in the same way as in the Comparative Example 17, except that a cathode having a porosity of 34% was made using $LiCoO_2$ as a cathode active material.

Comparative Example 54

A lithium secondary battery was manufactured in the same way as in the Comparative Example 18, except that a cathode having a porosity of 34% was made using $LiCoO_2$ as a cathode active material.

Embodiment 1

A lithium secondary battery was manufactured in the same way as in the Comparative Example 1, except that ethyl propionate was used instead of ethylmethyl carbonate.

Embodiment 2

A lithium secondary battery was manufactured in the same way as in the Comparative Example 4, except that ethyl propionate was used instead of ethylmethyl carbonate.

Embodiment 3

A lithium secondary battery was manufactured in the same way as in the Comparative Example 7, except that ethyl propionate was used instead of ethylmethyl carbonate.

Embodiment 4

A lithium secondary battery was manufactured in the same way as in the Comparative Example 10, except that ethyl propionate was used instead of ethylmethyl carbonate.

Embodiment 5

A lithium secondary battery was manufactured in the same way as in the Comparative Example 13, except that ethyl propionate was used instead of ethylmethyl carbonate.

Embodiment 6

A lithium secondary battery was manufactured in the same way as in the Comparative Example 16, except that ethyl propionate was used instead of ethylmethyl carbonate.

Embodiment 7

A lithium secondary battery was manufactured in the same way as in the Comparative Example 19, except that ethyl propionate was used instead of ethylmethyl carbonate.

Embodiment 8

A lithium secondary battery was manufactured in the same way as in the Comparative Example 22, except that ethyl propionate was used instead of ethylmethyl carbonate.

Embodiment 9

A lithium secondary battery was manufactured in the same way as in the Comparative Example 25, except that ethyl propionate was used instead of ethylmethyl carbonate.

Embodiment 10

A lithium secondary battery was manufactured in the same way as in the Comparative Example 28, except that ethyl propionate was used instead of ethylmethyl carbonate.

Embodiment 11

A lithium secondary battery was manufactured in the same way as in the Comparative Example 31, except that ethyl propionate was used instead of ethylmethyl carbonate.

Embodiment 12

A lithium secondary battery was manufactured in the same way as in the Comparative Example 34, except that ethyl propionate was used instead of ethylmethyl carbonate.

Embodiment 13

A lithium secondary battery was manufactured in the same way as in the Comparative Example 37, except that ethyl propionate was used instead of ethylmethyl carbonate.

Embodiment 14

A lithium secondary battery was manufactured in the same way as in the Comparative Example 40, except that ethyl propionate was used instead of ethylmethyl carbonate.

Embodiment 15

A lithium secondary battery was manufactured in the same way as in the Comparative Example 43, except that ethyl propionate was used instead of ethylmethyl carbonate.

Embodiment 16

A lithium secondary battery was manufactured in the same way as in the Comparative Example 46, except that ethyl propionate was used instead of ethylmethyl carbonate.

Embodiment 17

A lithium secondary battery was manufactured in the same way as in the Comparative Example 49, except that ethyl propionate was used instead of ethylmethyl carbonate.

Embodiment 18

A lithium secondary battery was manufactured in the same way as in the Comparative Example 52, except that ethyl propionate was used instead of ethylmethyl carbonate.

Embodiment 19

A lithium secondary battery was manufactured in the same way as in the Embodiment 5, except that the composition of ethylene carbonate:ethyl propionate=1:2 (volume ratio) is changed into a composition of ethylene carbonate:ethyl propionate=1:9 (volume ratio).

Embodiment 20

A lithium secondary battery was manufactured in the same way as in the Embodiment 5, except that the composition of ethylene carbonate:ethyl propionate=1:2 (volume ratio) is changed into a composition of ethylene carbonate:ethyl propionate=4:6 (volume ratio).

Embodiment 21

A lithium secondary battery was manufactured in the same way as in the Embodiment 5, except that the composition of ethylene carbonate:ethyl propionate=1:2 (volume ratio) is changed into a composition of ethylene carbonate:ethyl propionate=6:4 (volume ratio).

Comparative Example 55

A lithium secondary battery was manufactured in the same way as in the Embodiment 2, except that an anode having a capacity density of 3 mAh/cm$^2$ and a porosity of 15% was made as a substitute using $LiCoO_2$ as a cathode active material.

Comparative Example 56

A lithium secondary battery was manufactured in the same way as in the Embodiment 2, except that an anode having a capacity density of 6 mAh/cm$^2$ and a porosity of 15% was made as a substitute using $LiCoO_2$ as a cathode active material.

Comparative Example 57

A lithium secondary battery was manufactured in the same way as in the Embodiment 2, except that an anode having a capacity density of 3 mAh/cm$^2$ and a porosity of 40% was made as a substitute using $LiCoO_2$ as a cathode active material.

Comparative Example 58

A lithium secondary battery was manufactured in the same way as in the Embodiment 2, except that an anode having a capacity density of 6 mAh/cm$^2$ and a porosity of 40% was made as a substitute using $LiCoO_2$ as a cathode active material.

Measurement of Initial Performance and Life Cycle Performance of Batteries

After electrolyte was injected into the pouch-type batteries manufactured according to the Embodiments and the Comparative Examples, the batteries were aged at a normal temperature for 2 days and then charged for 50 minutes at a 0.2 C rate. Subsequently, the batteries were degassed and resealed, charged to 4.2V at a 0.2 C rate at room temperature under a constant current/constant voltage condition, and then discharged to 3.0V at a 0.2 C rate under a constant current condition, which is called an initial charging/discharging process. At this time, a ratio of charge capacity to the discharge capacity is called an initial efficiency. After the initial charging/discharging process, the batteries were charged/discharged 400 times at a 1.0 Crate in the same voltage region. A sustainable yield of capacity at 400 times relative to the initial discharge capacity is listed in the following Table 1.

Measurement of High-Rate Discharging Characteristic of Batteries

After the pouch-type batteries manufactured according to the Embodiments and the Comparative Examples were initially charged/discharged, the batteries were charged/discharged 4 times at a 1.0 C rate, charged at a 1.0 C-rate, and then discharged at a 0.2 C rate in the same voltage region. At this time, a ratio between a fourth discharge capacity at a 1.0 C rate and a discharge capacity at a 0.2 C rate is listed in the following Table 1.

Measurement of Low-Temperature Discharging Characteristic of Batteries

After the pouch-type batteries manufactured according to the Embodiments and the Comparative Examples were initially charged/discharged, the batteries were charged at a 1.0 C rate and discharged at a 0.2 C rate at normal temperature in the same voltage region. Subsequently, The batteries charged at a 1.0 C rate were put into a low-temperature chamber of −20° C., and then discharged at a 0.2 C rate. At this time, a ratio between discharge capacities at normal temperature and −20° C. is shown in the following Table 1.

TABLE 1

|  | Porosity (%) | Capacity density (mAh/cm²) | Initial efficiency (%) | High-rate discharge (%) | Low-temperature discharge (%) | Capacity sustainable yield (%) |
|---|---|---|---|---|---|---|
| Comparative Example 1 | 19 | 3.5 | 89.3 | 88.5 | 57 | 73 |
| Comparative Example 2 | 19 | 3.5 | 89.1 | 89.2 | 55 | 75 |
| Comparative Example 3 | 19 | 3.5 | 89.4 | 87.3 | 53 | 74 |
| Comparative Example 4 | 19 | 3.5 | 90.5 | 90.1 | 59 | 75 |
| Comparative Example 5 | 19 | 3.5 | 90.8 | 91.3 | 56 | 79 |
| Comparative Example 6 | 19 | 3.5 | 90.2 | 88.1 | 55 | 76 |
| Comparative Example 7 | 19 | 4.5 | 88.5 | 81.9 | 43 | 54 |
| Comparative Example 8 | 19 | 4.5 | 88.5 | 82.8 | 37 | 52 |
| Comparative Example 9 | 19 | 4.5 | 86.1 | 80.7 | 33 | 49 |
| Comparative Example 10 | 19 | 4.5 | 89.9 | 84.4 | 44 | 55 |
| Comparative Example 11 | 19 | 4.5 | 90.0 | 86.7 | 37 | 52 |
| Comparative Example 12 | 19 | 4.5 | 89.7 | 82.5 | 31 | 50 |
| Comparative Example 13 | 19 | 5.5 | 84.2 | 51.2 | 5 | 21 |
| Comparative Example 14 | 19 | 5.5 | 83.6 | 55.8 | 3 | 26 |
| Comparative Example 15 | 19 | 5.5 | 83.8 | 50.6 | 2 | 17 |
| Comparative Example 16 | 19 | 5.5 | 86.7 | 54.9 | 10 | 22 |
| Comparative Example 17 | 19 | 5.5 | 87.4 | 56.0 | 6 | 29 |
| Comparative Example 18 | 19 | 5.5 | 85.9 | 53.9 | 3 | 18 |
| Comparative Example 19 | 26 | 3.5 | 90.4 | 91.5 | 60 | 75 |
| Comparative Example 20 | 26 | 3.5 | 90.3 | 92.3 | 59 | 77 |
| Comparative Example 21 | 26 | 3.5 | 90.0 | 90.6 | 58 | 78 |
| Comparative Example 22 | 26 | 3.5 | 91.1 | 92.3 | 63 | 76 |
| Comparative Example 23 | 26 | 3.5 | 91.1 | 93.7 | 60 | 80 |
| Comparative Example 24 | 26 | 3.5 | 90.9 | 91.5 | 62 | 79 |
| Comparative Example 25 | 26 | 4.5 | 89.7 | 85.8 | 45 | 59 |

TABLE 1-continued

| | Porosity (%) | Capacity density (mAh/cm$^2$) | Initial efficiency (%) | High-rate discharge (%) | Low-temperature discharge (%) | Capacity sustainable yield (%) |
|---|---|---|---|---|---|---|
| Comparative Example 26 | 26 | 4.5 | 90.2 | 86.4 | 38 | 55 |
| Comparative Example 27 | 26 | 4.5 | 89.9 | 85.3 | 39 | 55 |
| Comparative Example 28 | 26 | 4.5 | 91.2 | 87.3 | 48 | 62 |
| Comparative Example 29 | 26 | 4.5 | 91.5 | 88.0 | 39 | 57 |
| Comparative Example 30 | 26 | 4.5 | 91.4 | 86.8 | 41 | 60 |
| Comparative Example 31 | 26 | 5.5 | 89.4 | 80.5 | 8 | 43 |
| Comparative Example 32 | 26 | 5.5 | 89.9 | 81.9 | 4 | 30 |
| Comparative Example 33 | 26 | 5.5 | 87.5 | 80.1 | 5 | 35 |
| Comparative Example 34 | 26 | 5.5 | 89.9 | 82.6 | 13 | 42 |
| Comparative Example 35 | 26 | 5.5 | 90.1 | 83.2 | 6 | 33 |
| Comparative Example 36 | 26 | 5.5 | 89.1 | 82.0 | 8 | 38 |
| Comparative Example 37 | 34 | 3.5 | 88.9 | 93.2 | 62 | 73 |
| Comparative Example 38 | 34 | 3.5 | 89.1 | 93.5 | 59 | 77 |
| Comparative Example 39 | 34 | 3.5 | 87.8 | 91.7 | 61 | 70 |
| Comparative Example 40 | 34 | 3.5 | 89.0 | 93.8 | 65 | 74 |
| Comparative Example 41 | 34 | 3.5 | 89.0 | 94.2 | 59 | 79 |
| Comparative Example 42 | 34 | 3.5 | 88.7 | 92.8 | 64 | 72 |
| Comparative Example 43 | 34 | 4.5 | 89.1 | 90.0 | 47 | 62 |
| Comparative Example 44 | 34 | 4.5 | 89.5 | 90.3 | 37 | 60 |
| Comparative Example 45 | 34 | 4.5 | 88.7 | 89.3 | 40 | 52 |
| Comparative Example 46 | 34 | 4.5 | 89.3 | 91.1 | 49 | 64 |
| Comparative Example 47 | 34 | 4.5 | 89.6 | 91.5 | 40 | 61 |
| Comparative Example 48 | 34 | 4.5 | 89.2 | 90.5 | 42 | 58 |
| Comparative Example 49 | 34 | 5.5 | 89.0 | 81.8 | 9 | 46 |
| Comparative Example 50 | 34 | 5.5 | 89.4 | 82.9 | 5 | 33 |
| Comparative Example 51 | 34 | 5.5 | 89.2 | 81.7 | 8 | 35 |
| Comparative Example 52 | 34 | 5.5 | 88.7 | 82.7 | 15 | 50 |
| Comparative Example 53 | 34 | 5.5 | 88.9 | 84.0 | 7 | 36 |
| Comparative Example 54 | 34 | 5.5 | 88.4 | 82.0 | 9 | 40 |
| Embodiment 1 | 19 | 3.5 | 92.1 | 94.7 | 75 | 83 |
| Embodiment 2 | 19 | 3.5 | 92.7 | 95.2 | 80 | 86 |
| Embodiment 3 | 19 | 4.5 | 92.2 | 93.8 | 74 | 81 |
| Embodiment 4 | 19 | 4.5 | 93.5 | 94.2 | 74 | 84 |
| Embodiment 5 | 19 | 5.5 | 90.8 | 90.7 | 68 | 78 |
| Embodiment 6 | 19 | 5.5 | 92.1 | 91.5 | 71 | 80 |
| Embodiment 7 | 26 | 3.5 | 93.3 | 95.2 | 79 | 85 |
| Embodiment 8 | 26 | 3.5 | 93.1 | 96.5 | 83 | 87 |
| Embodiment 9 | 26 | 4.5 | 93.2 | 94.8 | 75 | 82 |
| Embodiment 10 | 26 | 4.5 | 93.5 | 95.4 | 78 | 84 |
| Embodiment 11 | 26 | 5.5 | 92.4 | 94.0 | 70 | 80 |
| Embodiment 12 | 26 | 5.5 | 92.6 | 94.5 | 72 | 81 |
| Embodiment 13 | 34 | 3.5 | 91.9 | 95.9 | 82 | 83 |
| Embodiment 14 | 34 | 3.5 | 92.3 | 96.8 | 85 | 85 |
| Embodiment 15 | 34 | 4.5 | 91.8 | 94.7 | 76 | 83 |
| Embodiment 16 | 34 | 4.5 | 91.9 | 94.2 | 79 | 84 |
| Embodiment 17 | 34 | 5.5 | 92.1 | 92.8 | 72 | 82 |

TABLE 1-continued

| | Porosity (%) | Capacity density (mAh/cm²) | Initial efficiency (%) | High-rate discharge (%) | Low-temperature discharge (%) | Capacity sustainable yield (%) |
|---|---|---|---|---|---|---|
| Embodiment 18 | 34 | 5.5 | 92.5 | 93.5 | 75 | 85 |
| Embodiment 19 | 19 | 5.5 | 91.8 | 95.3 | 78 | 75 |
| Embodiment 20 | 19 | 5.5 | 91.3 | 89.7 | 65 | 78 |
| Embodiment 21 | 19 | 5.5 | 92.1 | 83.8 | 62 | 77 |
| Comparative Example 55 | 15 | 3.0 | 84.3 | 47.1 | 15 | 25 |
| Comparative Example 56 | 15 | 6.0 | 70.5 | 26.2 | 3 | 19 |
| Comparative Example 57 | 40 | 3.0 | 87.6 | 98.2 | 79 | 48 |
| Comparative Example 58 | 40 | 6.0 | 86.5 | 95.6 | 77 | 43 |

APPLICABILITY TO THE INDUSTRY

The lithium secondary battery of the present invention includes a desired mixed organic solvent without a linear carbonate, and a capacity density and a porosity of a cathode employing such a mixed organic solvent are designed within optimal ranges, so it may be manufactured as a high-loading lithium secondary battery that ensures excellent high-rate charging/discharging characteristics and improved life cycle and low-temperature discharging characteristic.

What is claimed is:

1. A non-aqueous electrolyte comprising:
a lithium salt; and
a non-linear carbonate-based mixed organic solvent consisting of (a) a cyclic carbonate compound expressed by the following Chemical Formula 1 and (b) a propionate-based ester compound expressed by the following Chemical Formula 3 wherein (a) and (b) are mixed at a volume ratio (a:b) in the range from about 10:90 to about 70:30, and (c) a vinylene carbonate expressed by the following Chemical Formula 2,

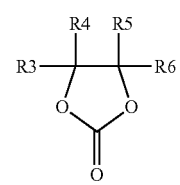

Chemical Formula 1 where R3 to R6 are independently any one selected from the group consisting of a hydrogen, fluorine, and an alkyl group having a carbon number of 1 to 4, respectively, and

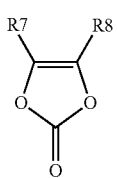

Chemical Formula 2 where R7 and R8 are independently a hydrogen or an alkyl group having a carbon number of 1 to 4, respectively,

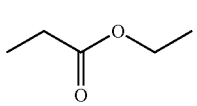

Chemical Formula 3 where $R_1$ and $R_2$ are independently a linear or branched $C_{1-6}$ alkyl group, and at least one of $R_1$ and $R_2$ is substituted with at least one halogen, respectively, and
linear carbonate compounds are excluded from the non-aqueous electrolyte.

2. The non-aqueous electrolyte according to claim 1, wherein the carbonate compound expressed by the Chemical Formula 1 is any one compound or a mixture of at least two compounds selected from the group consisting of ethylene carbonate, propylene carbonate, fluoroethylene carbonate and butylenes carbonate.

3. The non-aqueous electrolyte according to claim 1, wherein the propionate-based ester compound expressed by the Chemical Formula 3 includes an ethyl propionate-based ester compound expressed by the following Chemical Formula 4

Chemical Formula 4 where at least one hydrogen is substituted with fluorine.

4. The non-aqueous electrolyte according to claim 3, wherein the ethyl propionate-based compound expressed by the Chemical Formula 4 is any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

5. A non-aqueous electrolyte comprising:
a lithium salt;
a non-linear carbonate-based mixed organic solvent consisting of (a) a cyclic carbonate compound expressed by the following Chemical Formula 1 and (b) a propionate-based ester compound expressed by the following Chemical Formula 3, wherein (a) and (b) are mixed at a volume ratio (a:b) in the range from about 10:90 to about 70:30, and (c) a vinylene carbonate expressed by the following Chemical Formula 2; and an inhibitor being selected from the group consisting of vinyl group, fluorinated ethylene carbonate, vinylene carbonate, cyclic acid anhydride, a compound having a cyclic S=O group, and an acrylate-based compound:

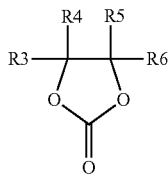

Chemical Formula 1 where R3 to R6 are independently any one selected from the group consisting of a hydrogen, fluorine, and an alkyl group having a carbon number of 1 to 4, respectively,

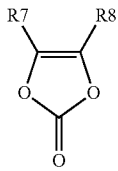

Chemical Formula 2 where R7 and R8 are independently a hydrogen or an alkyl group having a carbon number of 1 to 4, respectively, and

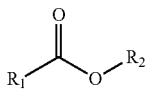

Chemical Formula 3 where $R_1$ and $R_2$ are independently a linear or branched $C_{1-6}$ alkyl group, and at least one of $R_1$ and $R_2$ is substituted with at least one halogen, respectively, wherein the content of the inhibitor is about 1 to 10 weight % based on the total weight of the non-aqueous electrolyte, and linear carbonate compounds are excluded from the non-aqueous electrolyte.

6. The non-aqueous electrolyte according to claim 5, wherein the propionate-based ester compound expressed by the Chemical Formula 3 includes an ethyl propionate-based ester compound expressed by the following Chemical Formula 4

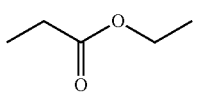

Chemical Formula 4 where at least one hydrogen is substituted with fluorine.

7. The non-aqueous electrolyte according to claim 6, wherein the ethyl propionate-based compound expressed by the Chemical Formula 4 is any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

* * * * *